Aug. 20, 1968 YOSHIHISA SUZUKI 3,398,301
CARRIER PHASE SELECTION TYPE SEMICONDUCTOR DEVICE
FOR OSCILLATION AND AMPLIFICATION OF MICROWAVES
Filed March 8, 1965

INVENTOR
Yoshihisa Suzuki
BY
H. Edward Masters

United States Patent Office 3,398,301
Patented Aug. 20, 1968

3,398,301
CARRIER PHASE SELECTION TYPE SEMICONDUCTOR DEVICE FOR OSCILLATION AND AMPLIFICATION OF MICROWAVES

Yoshihisa Suzuki, Nakano-ku, Tokyo-to, Japan, assignor to Kabushiki Kaisha Hitachi Seisakusho, Chiyoda-ku, Tokyo-to, Japan, a joint-stock company of Japan Filed Mar. 8, 1965, Ser. No. 438,009
Claims priority, application Japan, Mar. 16, 1964, 39/14,379; July 14, 1964, 39/39,053
3 Claims. (Cl. 307—299)

ABSTRACT OF THE DISCLOSURE

A carrier-phase selection type semiconductor device for oscillation and amplification of microwaves, comprising a rod-like base electrode, a thin-film semiconductor layer on the base electrode, a metal electrode on the semiconductor layer, a coaxial resonator encompassing the whole of the above members, and a magnet member forming a magnetic field in the direction transverse to the injection of electric carriers injected from the base electrode. The injected carriers are caused to undergo circular motion by the magnetic field and, in addition, are accelerated or decelerated by the electric field component of the electromagnetic field developing within the resonator, whereby the kinetic power of the carriers having predetermined phase states with respect to the electric field component are converted into radio frequency electromagnetic power.

This invention relates to a carrier phase selection type new semiconductor electron device which is highly effective for oscillation and amplification microwaves.

Heretofore, in semiconductor electron devices, in general, there have been upper limits to their usable frequencies. For example, in transistors the limit has been of the order of 1,000 mc., and even in the case of diodes for multipliers and tunnel diodes, the limit has been of the order of 100 gc. In the present state of the art, very high working frequency regions for such devices cannot be expected in the near future.

Thus, it has not been possible to operate known devices of the above mentioned character at frequencies in intrinsically high frequency regions, and there have been limits to their working frequencies. The principal reasons for this are that, in devices in which these semiconductors are used, the operations of these devices themselves have unavoidably been of lumped constant character and that, moreover, special consideration has not been given to the transit time of carriers such as electrons or positive holes utilized in these devices.

With regard to the above mentioned first difficulty, it has heretofore been proposed to dispose diodes in a row and cause traveling wave type operation. However, these devices in themselves are invariably concerned with lumped constants and cannot overcome their drawbacks. Concerning the second difficulty, since the life of the carrier in the semiconductor by its nature is short, it has not been possible to take positive steps to utilize its transit time.

More explicitly, the drift velocity of carriers in a semiconductor is slower by approximately two figures than electrons in electron tubes. For this reason, even if it is desired to utilize the transit time, it is necessary to construct the slow-wave circuit and coupling structure for input and output with a precision of an order which is higher by two figures than that of these members used in electron tubes. This is extremely difficult to realize with conventional construction in the original state, whereby the drawbacks of such arrangements could not be eliminated in the past.

On the other hand, electron tubes are also accompanied by difficulties. Although electron tubes capable of accomplishing oscillation and amplification at frequencies up to short millimetric waves have been produced, their working voltages are relatively high, and the scope of their utilization is extremely restricted because of economic reasons. In addition, it is difficult to operate these electron tubes in regions of shorter wavelength because of constructional reasons and because their electron beam densities intrinsically cannot be made as high as in semiconductors.

It is a general object of the present invention to overcome the above described difficulties.

More specifically, it is an object of the present invention to provide a semiconductor electron device of a relatively simple construction and operation cable of operating at frequencies in a substantially high frequency region with the use of a low working voltage.

In the device according to the invention, a slow-wave circuit, which has heretofore presented difficulties in construction, is unnecessary, and the interaction of electric carriers, magnetic field and radio frequency electromagnetic field is effectively utilized through the use of thin film semiconductor layers.

According to the present invention, briefly stated, there is provided a carrier phase selection type semiconductor device for oscillation and amplification of microwaves comprising a thin film semiconductor provided within a circuit structure which has a distributed constant, and in which there is formed a radio-frequency electromagnetic field, means to inject carriers into said semiconductor, and magnetic field formation means for causing said injected carriers to undergo circular motion, the carriers having desirable phase states with respect to the radio frequency electromagnetic field being selected, thereby to convert the direct current kinetic power of said carriers into radio frequency electromagnetic power.

The nature, principle, and details of the invention will be more clearly apparent from the following detailed description with respect to preferred embodiments of the invention when read in conjunction with the accompanying drawings in which like parts are designated by like reference characters, and in which.

Figure 1:
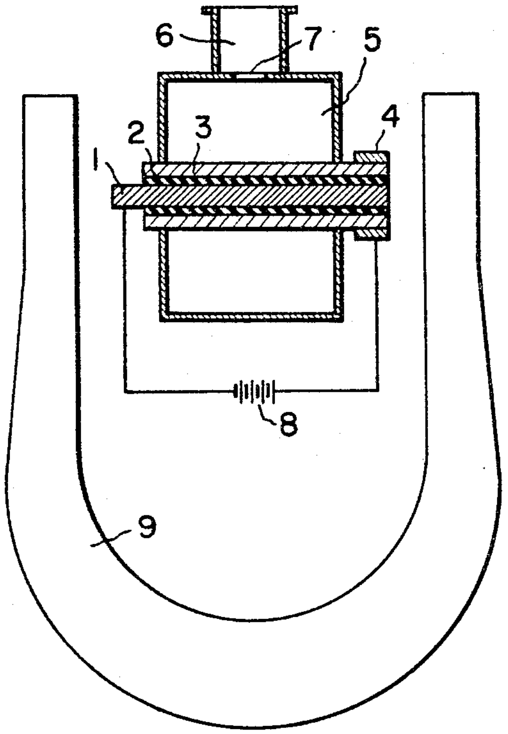
FIGURE 1 is a schematic diagram, partly in section, showing the essential construction of one embodiment of the semiconductor electron device according to the invention.

Referring to FIGURE 1, which shows one embodiment of the invention, there is provided an electrode 1 constituting a base for injecting carriers such as electrons or positive holes through a thin film isolator 2 into a semiconductor layer 3. A metal electrode 4 is provided on the semiconductor layer 3 to apply thereto a specific potential. A distributed (constant) circuit 5 consisting of, for example, a coaxial resonator, is disposed to encompass the semiconductor layer 3 so as to apply thereto a distributed microwave electric field and is connected to a wave guide 6 with which it is communicated through a coupling hole 7. A D-C power source 8 is connected across the electrodes 1 and 4. The essential parts of the above described device are disposed in a magnetic field established by a device which, in the example shown in FIGURE 1, is a horseshoe-type permanent magnet 9.

For the semiconductor layer 3, a semiconductor of a character such that carriers therein have a long life such as, for example, a semiconductor made from bismuth is suitable. However, in accordance with the frequency to be used, other substances can be used by appropriately cooling them, because, by cooling the semiconductor layer to a low temperature (if necessary, to an extremely low temperature), it is possible to lengthen the carrier life within the semiconductor. The effect of this cooling is such that, in the case of bismuth, for example, its use at an extremely low temperature results in a transit length of the order of millimeters.

In a device of the construction indicated in FIGURE 1, the electric field established by the coaxial resonator 5 in the radial direction of the semiconductor layer 3 permeates also into the interior of the semiconductor layer in the case where the thickness of this layer is made to be in a range wherein it is not influenced by the skin effect in the electric field.

On one hand, carriers are injected into the semiconductor layer 3 through the electrode 1 and insulator coating 2. When aluminum (or an aluminum-clad metal), for example, is used for the electrode 1, alumina is highly effective for the insulator coating 2 because it is easily formed, and, moreover, its use in a device of this construction affords, particularly, a large injection quantity of the carriers. For the carrier injection, a pn junction may be used instead of the electrode 1 and insulator coating 2. The velocity of the injected carrier is in the range of from 0.1V to a number of V.

In order to indicate the principle of the present invention, the following analytical consideration is presented with respect to an injected carrier velocity of 0.2V, as one example. It will be assumed that, on one hand, a magnetic field of a flux density of B gauss is applied in the axial direction. In this case, since the injected carriers undergo motions which are similar to those in free space in the time until they collide with a lattice and other objects, that is, in the range of their lifetime, they undergo circular motions determined by the magnetic field intensity and the injection velocity (V electron volts). The radius $r$ of such a circular motion is expressed by the following equation.

$$r=33.7\frac{\sqrt{V}}{B}\cdot\sqrt{\frac{m^*}{m_e}}\ (\text{mm.})$$

where:

$m_e$ is the mass of free electrons and $m^*$ is the effective mass of electrons within the semiconductor, the ratio $m^*/m_e$ being taken to be 0.2 in this case.

For $V=0.2V$ and $B=2{,}000$ gauss, $r$ becomes approximately 3 microns.

If the film thickness is made equal to 3 microns of this circular motion radius, any carrier of higher velocity will collide with the outer surface of the film after undergoing approximately ¼ revolution and will be scattered, and only carriers of slower velocity can revolve through approximately ½ revolution.

Next, since a radio-frequency electric field is applied in the radial direction, a carrier which is injected at a certain phase is accelerated in the radial direction, and carriers injected at other phases are decelerated. If the period of this radio-frequency wave is caused to be reversed in direction when a carrier has revolved through ¼ revolution, that is, if the frequency $f$ of the radio-frequency field is twice the cyclotron frequency $f_c$ of the magnetic field, an initially decelerated carrier will be further decelerated after it has revolved through ¼ revolution and will continue its circular motion, and phase selection will be accomplished.

$$f=2f_c=5.6\times10^{-3}B/\frac{m^*}{m_e}\ (\text{gc.})$$

That is, in the case of the aforementioned magnetic field of $B=2{,}000$ gauss, the operation is accomplished at a high frequency of $f=56$ gc.

Figure 2:
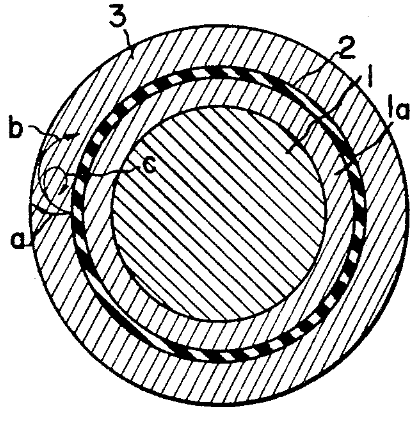
FIGURE 2 is a cross sectional view showing the construction of an essential part of the device shown in FIGURE 1.

FIGURE 2 indicates forms of motions of carriers, the motion of a carrier which is neither accelerated nor decelerated being indicated by path $b$, that of an accelerated carrier being indicated by path $a$, and that of a decelerated carrier being indicated by path $c$. The example shown in FIGURE 2 applies to the case where an aluminum coating layer 1*a* is provided about the center electrode 1.

Since the lifetime in the case of a decelerated carrier $c$ is longer than that in the case of a carrier $a$, the average effect is that the injected carriers are decelerated. By this phase selection, the direct-current kinetic energy of the injected carriers is converted into radio-frequency electromagetic field energy.

Since the sealing of the entire device or a part thereof in a vacuum or a non-active gas in order to prevent variations in characteristics of the semiconductor and other parts when exposed to air can be readily accomplished by application of known techniques in the fabrication of electron tubes and discharge tubes, detailed description relating to such procedure will herein be omitted.

Furthermore, the arrangement of the metal electrode 4 is not limited to that wherein it is disposed outside of the resonator. It is also possible to deposit by evaporation a thin film of gold on the entire outer surface of the semiconductor layer, thereby to provide low absorption of microwaves and high electric field intensity. Although the output varies with the configuration of the device, it is of the order of 10 mw. in one example case where fabrication is easy with respect to an input D-C power, of the order of 0.2 volt and 1 ampere.

Figure 3:
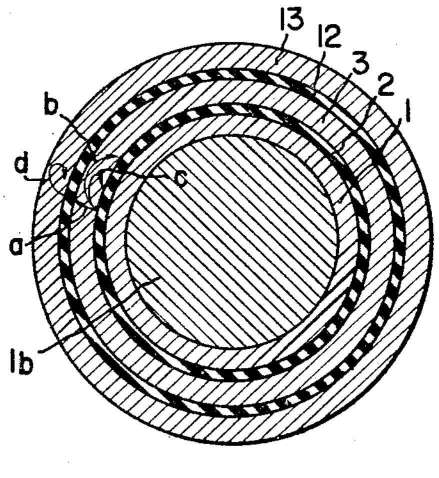
FIGURE 3 is a cross sectional view showing the construction of an essential part of another embodiment of the invention.

In another embodiment of the invention as shown in FIGURE 3, there are provided double layers of thin film constituting parts for converting the kinetic energy of injected carriers into radio-frequency energy, the operational principle of which will be described hereinbelow.

The electrons which have passed from a base metal $\mathbf{1}_a$ through a thin-film insulator 2 (when the base metal $\mathbf{1}_a$ is made of aluminum, the isolator 2 is preferably of alumina with a thickness of from 50 to 150 angstroms) and injected into a thin film semiconductor 3 are classified into three phase relationships represented by $a$, $b$ and $c$ with respect to the phase the radio-frequency electric field. The forming of the radio-frequency electric field and the magnetic field intensity are similar to those described in the preceding example described with reference to FIGURE 2.

The electrons of the phase $b$ just reach the outer surface of the thin film semiconductor and return, indicating that they have been neither accelerated nor decelerated by the radio-frequency electric field. The electrons of the phase $c$ are decelerated and continue circular motion, but since the magnetic field intensity and frequency have been so selected that, just at the point of inversion of movement of these electrons, the phase of the radio frequency is also inverted, the deceleration of these electrons is continued, and the reduction of the kinetic energy thereof is converted into radio-frequency energy.

$$f=2f_c=5.6\times10^{-3}B\frac{m_e}{m^*}\ (\text{gc.})$$

(Where B is in the unit of gauss.)

The electrons of the phase $a$ are in a phase for acceleration by the radio-frequency field and entail loss of radio-frequency energy in this first thin-film semiconductor. In the example described with reference to FIGURE 2, these electrons are scattered at the outer surface of the thin-film semiconductor 3. In the case of the example shown in FIGURE 3, however, this carrier is also utilized. That is, the electrons in the phase *a* increase the probability of injection by which carriers passed through the succeeding thin film insulator 12 into the second thin film semiconductor 13.

In this manner, the carrier injected into the second thin-film semiconductor 13 is emitted outwardly in the radial direction with a kinetic energy corresponding to the electric potential applied to the thin-film insulator 12 and, by the interaction thereof with the magnetic field, traces an orbit as indicated by path *d* in the second thin-film semiconductor. In the case of phase *a* which is unfavorable for radio-frequency energy conversion, the phase with respect to the carrier of phase *d* which has passed through ½ period just becomes the phase for converting kinetic energy into radio-frequency energy, that is, the phase for deceleration by the radio-frequency field.

Thus, the carrier of phase *a* which had been in an unfavorable phase in the first thin-film semiconductor induces a carrier of favorable phase in the second thin-film semiconductor. Consequently, the operation of changing direct-current kinetic energy into radio-frequency energy, which is an object of the present invention, is accomplished in an efficient manner.

In the case when the voltage applied to the thin-film insulator 12 is equal to the voltage applied to the thin film insulator 2, it is necessary to select the thickness of the second thin-film semiconductor to be approximately equal to the thickness of the first thin-film semiconductor. By disposing these thin-film insulators and thin-film semiconductors in alternate laminar arrangement, a carrier in a favourable phase within the *n*th thin-film semiconductor continues its circular motion therein, and a carrier in an unfavorable phase functions to give rise to a carrier of a favourable phase within the (*n*th+1) thin-film semiconductor, whereby it is possible to form laminations to a thickness through which the radio-frequency field can permeate as a whole. Thus, the D-C input voltages as a whole increases, and, consequently, the resulting radio-frequency output power increases.

It is possible, of course, to produce the thin-film insulators and thin-film semiconductors by ordinary methods, that is, for example, by the evaporation deposition method or the epitaxial growth method. However, it is also possible to use substances such as pyrolytic graphite in which the crystal structure itself possesses the property whereby it has conductivity in the directions of axes *a* and *b* and low conductivity in the *c*-axis direction because of large lattice constant in the *c*-axis direction.

That is, in the case of the example illustrated in FIGURE 3, by particularly disposing the thin-film insulators and thin-film semiconductors in laminar arrangement, the radio-frequency output is increased. Furthermore, as is apparent from the operational principle of the device, since a number, which is statistically large, of carriers in the required phase is used, it is possible to improve the total efficiency.

As is apparent from the foregoing description, while oscillation or amplification of millimeter waves by means of conventional electron tubes requires a high voltage source of the order of several thousands of volts, the electron device of the present invention is capable of accomplishing the same operations with an extremely simple power source such as, for example, a single unit cell.

Furthermore, the device of this invention is capable of operating in a high frequency region in which conventional transistors cannot operate. The device of the invention, moreover, does not require a pumping power source as in the case of a parametric amplifier and has additional advantages such as its capability of producing a high power output because it does not have lumped constants as in the case of tunnel diodes.

It should be understood, of course, that the foregoing disclosure relates to only preferred embodiments of the invention and that it is intended to cover all changes and modifications of the examples of the invention herein chosen for the purposes of the disclosure, which do not constitute departure from the spirit and scope of the invention as set forth in the appended claims.

What I claim is:

1. A carrier-phase selection type semiconductor device for oscillation and amplification of microwaves, comprising: a base electrode for injecting electric carriers; a thin-film semiconductor material laminated on the base electrode; a metal electrode provided on the thin-film semiconductor material for applying an electrostatic field thereto; a circuit structure having a distributed constant for developing a radio-frequency electromagnetic field, the direction of the electric field component thereof being transverse to the plane of the thin-film semiconductor material and in the same direction as that of the injection of the electric carriers injected from the base electrode into the thin-film semiconductor material; means for forming a magnetic field in the direction transverse to the injection of the electric carriers so as to cause the injected carriers to undergo circular motion; and the thickness of the semiconductor material being such that the injected carriers having predetermined phase states with respect to the radio-frequency electromagnetic field selected, thereby to convert the direct-current kinetic power of the carriers into radio-frequency electromagnetic power.

2. The carrier-phase selection type semiconductor device according to claim 1, wherein said base electrode is an aluminum base with an aluminum-oxide film thereon.

3. The carrier-phase selection type semiconductor device according to claim 1, wherein said thin-film semiconductor is a plurality of thin-film semiconductor layers, each separated by a thin-film insulator, and the thickness of each of the semiconductor layers is substantially equal to the average radius of the circular motion of the injected carriers.

References Cited

UNITED STATES PATENTS

| | | | |
|---|---|---|---|
| 3,121,177 | 2/1964 | Davis | 317—234 |
| 3,122,655 | 2/1964 | Murray | 317—235 |
| 3,173,102 | 3/1965 | Loewenstern | 317—235 |
| 3,213,359 | 10/1965 | Freytag et al. | 307—88.5 |
| 3,228,011 | 1/1966 | Crane | 307—88.5 |

JOHN W. HUCKERT, *Primary Examiner*.

R. F. POLLISSACK, *Assistant Examiner*.